United States Patent [19]
Suzuki

[11] Patent Number: 6,028,303
[45] Date of Patent: Feb. 22, 2000

[54] POLARIZING FILTER CONTROL MECHANISM TO REDUCE REFLECTED LIGHT

[75] Inventor: Toshio Suzuki, Yokohama, Japan

[73] Assignee: Nikon Corporation, Tokyo, Japan

[21] Appl. No.: 08/971,105

[22] Filed: Nov. 14, 1997

[30] Foreign Application Priority Data

Nov. 14, 1996 [JP] Japan ................................. 8-318757

[51] Int. Cl.[7] .............................. G02F 1/01; H01J 40/14
[52] U.S. Cl. ......................... 250/225; 359/493; 359/501; 359/601
[58] Field of Search ........................... 250/225; 396/544; 359/493, 501, 502, 601, 603, 608, 891

[56] References Cited

U.S. PATENT DOCUMENTS

| | | | |
|---|---|---|---|
| 2,423,321 | 7/1947 | Hurley, Jr. .............................. | 350/407 |
| 3,446,977 | 5/1969 | Bateson .................................. | 250/225 |
| 4,063,266 | 12/1977 | Thomas et al. ......................... | 359/502 |

*Primary Examiner*—Stephone Allen

[57] ABSTRACT

A polarizing filter control mechanism used in a camera that automatically rotates a polarizing filter in order to minimize the effects of reflected light on a photographic image. An image signal is obtained by an imaging element that converts image light of a photographic subject into an electrical signal. A level detection unit outputs a level detection signal that corresponds to the electrical signal. A minimum value detection unit compares the level detection signal with a reference signal. Using this comparison, the minimum value detection unit outputs an error signal based on a difference between the level detection signal and the reference signal. A drive control unit rotates the polarizing filter until the difference between the level detection signal and the reference signal is minimized.

10 Claims, 5 Drawing Sheets

POLARIZING FILTER CONTROL MECHANISM TO REDUCE REFLECTED LIGHT

CROSS-REFERENCE TO RELATED APPLICATIONS

This application is based upon and claims priority of Japanese Patent Application No. 08-318757 filed Nov. 14, 1996, the contents being incorporated herein by reference.

BACKGROUND OF THE INVENTION

The present invention relates to a polarizing filter control mechanism. More particularly, the present invention relates to a polarizing filter control mechanism to automatically reduce reflected light during operation of a photographic apparatus.

The effects of reflected light have long been a common problem for both professional and novice photographers and videographers alike. When a subject to be photographed is surrounded by a reflective background, such as glass windows, light is reflected back towards the photographer. This reflected light corrupts the resulting photographed image and makes it difficult to identify the subject.

Light shining from a reflective surface corrupts a photographic image because such light is reflected at angles perpendicular to the surface of incidence of light. One way to eliminate reflected light is to place a polarizing filter between the photographer and the subject to be photographed. The polarizing filter eliminates reflected light by allowing only unilateral, linear polarization light to penetrate the camera. Use of a polarizing filter is therefore widely known as a method to eliminate the effects of reflected light. For example, in conventional photographic and video cameras, a polarizing filter is placed in front of a lens. The polarizing filter is then manually rotated by the user to a rotational angle that minimizes the intensity of the reflected light.

Use of such a manual polarizing filter can be tedious and awkward. First, a user must manually rotate the polarizing filter to an angle that minimizes the reflected light. At the same time, the user must also visually verify that the intensity level of reflected light is at a minimum. Having to visually inspect the intensity of reflected light distracts the user's attention from the rotation position of the polarizing filter. As a result, the minimizing rotation angle setting is impaired. Likewise, having to verify the polarizing filter rotation position distracts the user's attention from verifying the intensity of reflected light. As a result, the minimizing intensity level is impaired.

In addition, photographic opportunities are often missed during manual operation of the polarizing filter. For example, when using a front element focusing lens, the polarizing filter sometimes rotates with each focusing operation. Therefore, the polarizing filter must be manipulated again after the focusing operation.

In some instances, the photographic subject may be moving. For example, an occupant of a car may be taking photographs of the outdoors while looking through a window of the car. The intensity of the reflected light periodically changes as the subject moves. The user must therefore operate the polarizing filter while following the subject. Since the subject is moving, the user must manually operate the polarizing filter in addition to the focusing and zooming operations. Having to focus one's attention simultaneously to all these operating factors can be overwhelming. Many different types of element focusing lens and front element zooming lens can be used. But none help to alleviate this overwhelming effect. Moreover, during video photography, in particular, it is difficult for a photographer to operate the polarizing filter and to follow the subject.

BRIEF SUMMARY OF THE INVENTION

It is therefore an object of the present invention to provide prompt and accurate operation of a polarizing filter.

It is another object of the present invention to eliminate a need to manually operate a polarizing filter while performing normal operation of a camera.

It is a further object of the present invention to provide a polarizing filter that automatically eliminates an area that corresponds to reflected light in still and video photography.

It is a still further object of the present invention to provide a camera that can easily follow a moving subject.

It is yet another object of the present invention to provide a polarizing filter that automatically reduces the changing effects of reflected light.

Objects of the invention are achieved by a polarizing filter control mechanism, including a polarizing filter; a level detection unit to output a level detection signal corresponding to an image signal of a subject; and a drive control unit to rotate the polarizing filter to minimize the level detection signal.

Further objects of the invention are achieved by a polarizing filter control device, including a polarizing filter; a level detection unit to output a level detection signal corresponding to an image signal of a subject; a drive control unit to rotate the polarizing filter to minimize the level detection signal; and a minimum value detection unit to compare the level detection signal with a reference signal and output a corresponding error signal.

Even further objects of the invention are achieved by a polarizing filter control mechanism in a camera, including a polarizing filter; a level detection unit to output a level detection signal corresponding to an image signal of a subject; a drive control unit to rotate the polarizing filter; an imaging element to convert the image signal of the subject to a corresponding electrical signal, wherein the electric signal is input to the level detection unit; and a minimum value detection unit to compare the level detection signal with a reference signal and output a corresponding error signal, wherein the drive control unit minimizes the level detection signal through rotation of the polarizing filter in response to the error signal.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout.

Figure 1:
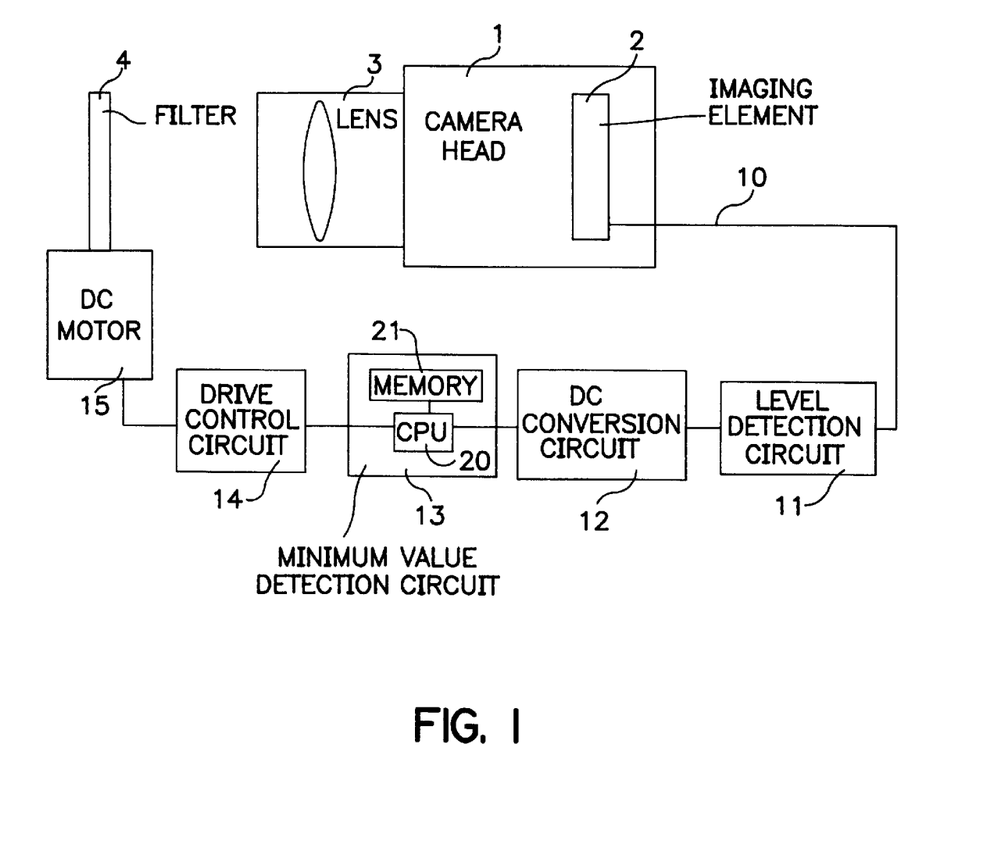
FIG. 1 is a block diagram illustrating a video camera equipped with a polarizing filter control mechanism according to a preferred embodiment of the present invention.

FIG. 1 illustrates a video camera 30 equipped with a preferred embodiment of a polarizing filter control mechanism of the present invention. The video camera 30 has a camera head 1, an imaging element 2, a lens 3, a polarizing filter block 4, a level detection circuit 11, a DC conversion circuit 12, a minimum value detection circuit 13, a drive control circuit 14, and a DC motor 15.

Image light from a subject is received through polarizing filter block 4 and lens 3. Imaging element 2, positioned on camera head 1, converts image light into an electrical signal. The electrical signal is then output as an image signal 10. In a preferred embodiment, image signal 10 includes charge coupled device ("CCD") elements. Image signal 10 is then transmitted to level detection circuit 11 through an electrical connection with imaging element 2. Level detection circuit 11 outputs a signal that corresponds to image signal 10. DC conversion circuit 12 is electrically connected with level detection circuit 11 and receives a level detection signal output from level detection circuit 11. The level detection signal from level detection circuit 11 is received by DC conversion circuit 12. DC conversion circuit 12 converts the level detection signal into a DC voltage output. DC conversion circuit 12 includes an integration circuit that uses a low pass filter or the like.

Minimum value detection circuit 13 is equipped with a central processing unit ("CPU") 20 and a memory 21. Minimum value detection circuit 13 is electrically connected with DC conversion circuit 12. A DC voltage output signal from DC conversion circuit 12 is received by minimum value detection circuit 13. Minimum value detection circuit 13 compares the DC voltage output signal of DC conversion circuit 12 to a reference signal stored in memory 21. Minimum value detection circuit 13 outputs an error signal that corresponds to a difference between the DC voltage output signal and the reference signal. Drive control circuit 14 is electrically connected with minimum value detection circuit 13. Drive control circuit 14 controls a rotational angle position of a polarizing filter in polarizing filter block 4. Drive control circuit 14 rotates DC motor 15 so that an output signal from DC conversion circuit 12 is at a minimum value. The minimum value is based on the output signal of minimum value detection circuit 13. DC motor 15 is electrically connected with drive control circuit 14 and mechanically joined with polarizing filter block 4 to transmit the rotation of DC motor 15. DC motor 15 rotates the polarizing filter of polarizing filter block 4 based on a voltage output from drive control circuit 14.

Polarizing filter block 4 is equipped with a polarizing filter for eliminating reflected light from the image light. Polarizing filter block 4 is placed in front of lens 3. Lens 3 is attached to camera head 1 by either a support section (not shown) installed below lens 3, or a support section (not shown) that extends from a bottom, or a front, of camera head 1. Lens 3 may also be attached to camera head 1 with a removable configuration, such as a cover (not shown) placed on an end of lens 3. Although not shown, polarizing filter block 4 can be freely and easily removed from an optical path to select whether the polarizing filter should be used for photographic effects.

Figure 2:
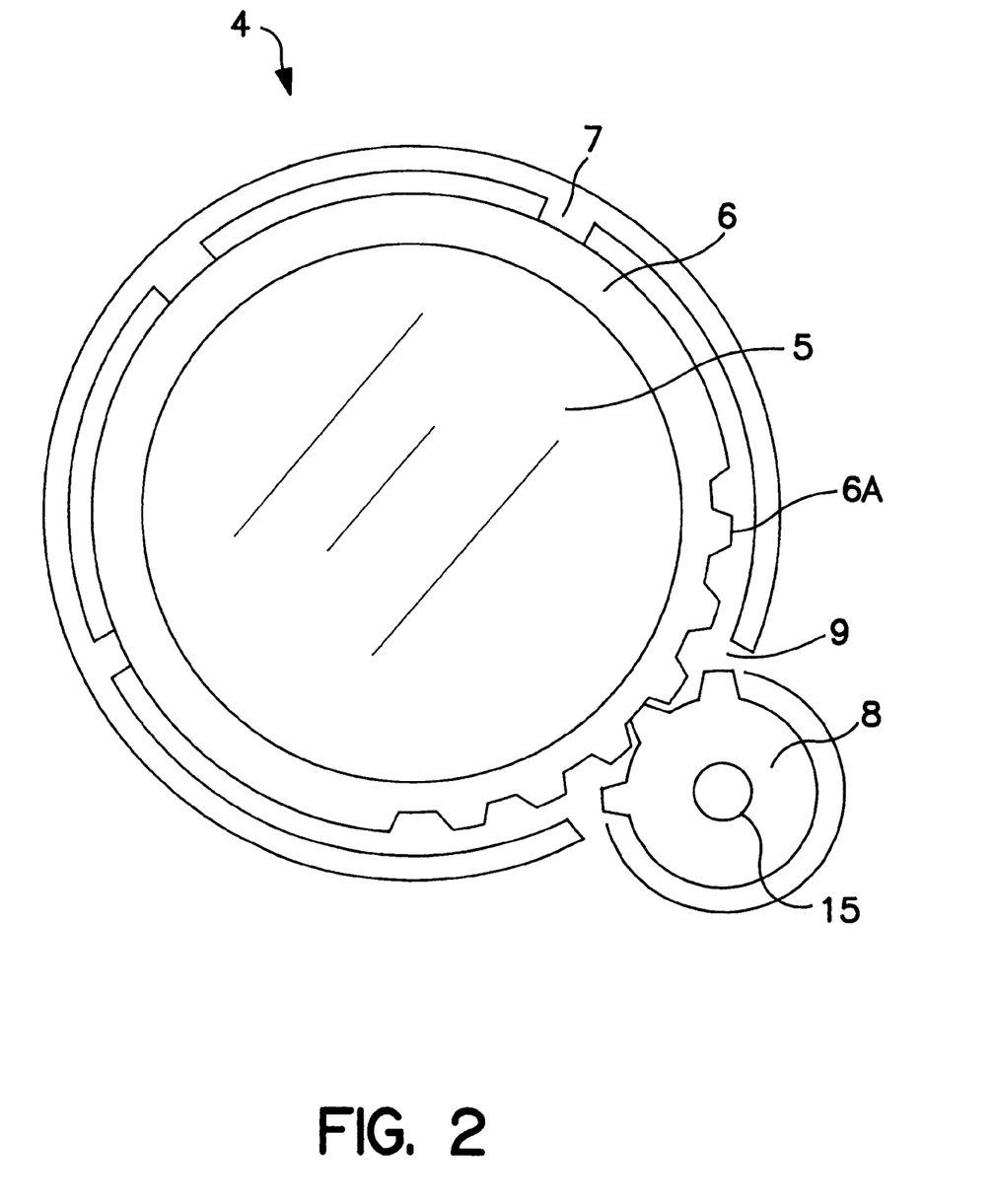
FIG. 2 is a front planar view of a polarizing filter block used in the video camera of FIG. 1.

FIG. 2 illustrates a detailed configuration of polarizing filter block 4 according to a preferred embodiment of the present invention. Polarizing filter block 4 is equipped with a polarizing filter 5, a polarizing filter drive ring 6, and a fixing frame 7. Polarizing filter 5 adheres to a polarizing film with an optical glass, to allow penetration of the image light having unilateral, linear polarization. Polarizing filter 5 is retained by polarizing filter drive ring 6. Polarizing filter drive ring 6 has a gear section 6A. Fixing frame 7 is fastened to polarizing filter drive ring 6 and allows rotational movement of drive ring 6. Since reflected light is reflected perpendicular to the surface of the incidence of light, it is preferable for polarizing filter 5 to be able to rotate at least 90 degrees or more to eliminate the reflected light. As a result, gear section 6A extends at least 90 degrees or more along a rotational angle. A section of fixing frame 7 has an open section 9. A portion of polarizing filter drive ring 6 gear section 6A meshes with a transmission gear 8 through open section 9 of fixing frame 7. Transmission gear 8 has teeth positioned along its entire circumference and is installed on DC motor 15 and controlled by drive control circuit 14.

FIG. 2 illustrates a configuration in which polarizing filter 5 is rotated by transmitting the rotation of DC motor 15 to drive ring 6. A belt or other configuration may be substituted for a gear as long as polarizing filter 5 can be rotated.

As illustrated in FIG. 1, the image light of the subject received by polarizing filter block 4 and lens 3 is converted into an electrical signal by imaging element 2. The electrical signal is then output from imaging element 2 as image signal 10. Image signal 10 is input by level detection circuit 11 and then output as a signal corresponding to the level of the image signal 10. Preferably, a synchronous signal is eliminated at level detection circuit 11 and a signal corresponding to the level of an image signal from which the synchronous signal has been removed is output from level detection circuit 11.

Although it is difficult to view the image and identify the subject when image light contains reflected light, a clear, vivid image can be obtained by eliminating reflected light using the polarizing filter 5 illustrated in FIG. 2. Polarizing filter 5 allows image light having unilateral, linear polarization to penetrate lens 3. As a result, a vivid image and corresponding image signal is achieved. When polarizing filter 5 is rotatably installed in front of lens 3, rotation of polarizing filter 5 decreases the effect of reflected light.

Figure 3A:
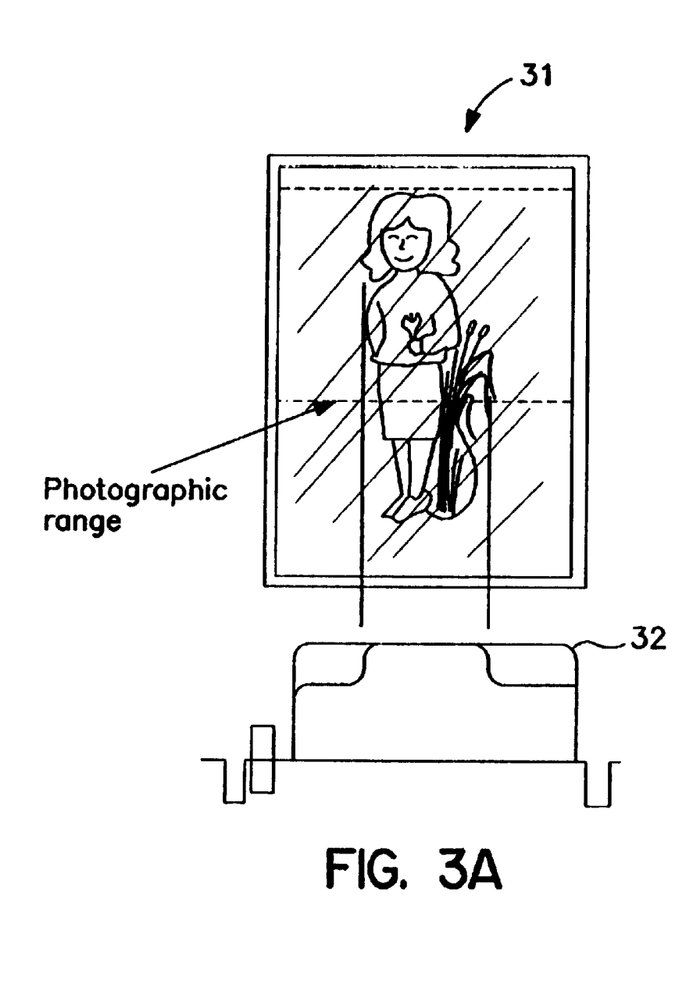
FIG. 3A is a front planar view of an image and corresponding horizontal image signal when a polarizing filter is at a rotational angle allowing penetration of reflected light according to a preferred embodiment of the present invention.
Figure 3B:
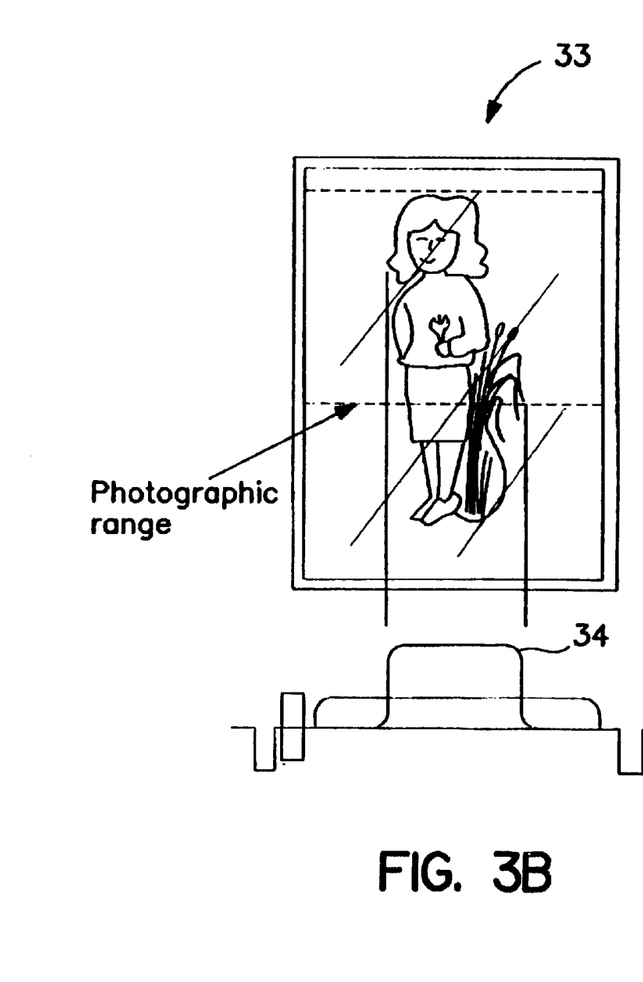
FIG. 3B is a front planar view of an image and corresponding horizontal image signal when a polarizing filter is at a rotational angle not allowing the penetration of reflected light according to a preferred embodiment of the present invention.

FIG. 3A illustrates an image 31 and a horizontal image signal 32 when the polarizing filter is located at a rotational angle position allowing penetration of reflected light. FIG. 3B illustrates an image 33 and a corresponding horizontal image signal 34 as reflected light is decreased by rotating the polarizing filter to a rotational angle that does not allow reflected light to penetrate.

As described above, an image signal that has limited effects from reflected light can be obtained by rotating polarizing filter 5 to reduce reflected light. Moreover, non-reflected image light is not polarized and therefore is not affected by the rotation of polarizing filter 5. As a result, reflected light from image signal 10 is decreased by rotating polarizing filter 5 to reduce the level of the entire image signal that contains reflected light.

Figure 4:
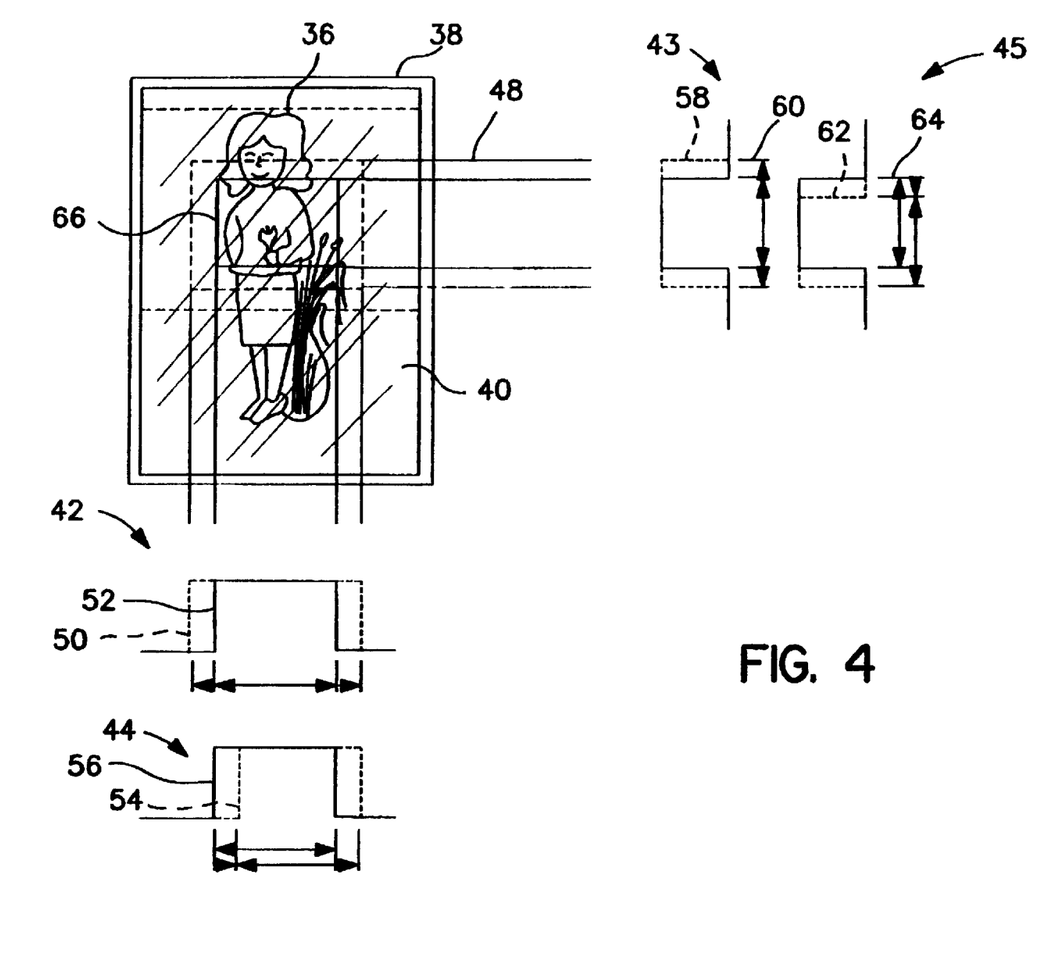
FIG. 4 is a front planar view of a photographic image illustrating how gate pulses in horizontal and vertical directions are set to select a portion of an image signal according to a preferred embodiment of the present invention.

When an image only partially contains reflected light, it is preferable to only select the image signal in that particular region. This partial selection of the image signal enables a more precise elimination of reflected light. FIG. 4 illustrates the process of setting gate pulses in both horizontal and vertical directions in order to select a part of the image signal. The range of the image signal is selected by the user while looking at an image of the subject 36 through a viewfinder 38. Any part of the image signal 40 can be selected by selecting a horizontal pulse width 42 and a horizontal pulse position 44 of a horizontal image signal gate pulse 46, along with a vertical pulse width 43 and a vertical pulse position 45 of a vertical image signal gate pulse 48.

For example, the horizontal image signal gate pulse 46 can be changed from a first horizontal pulse width 50 (shown by dotted lines), to a second horizontal pulse width 52 (shown by solid lines). The horizontal pulse position 44 can also be changed from a first horizontal pulse position 54 (shown by dotted lines) to a second horizontal pulse position 56 (shown by solid lines). Likewise, the vertical image signal gate pulse 48 can be changed from a first vertical pulse width 58 (shown by dotted lines) to a second vertical pulse width 60 (shown by solid lines). The vertical pulse position 48 can also be changed from a first vertical pulse position 62 (shown by dotted lines) to a second vertical pulse position 64 (shown by solid lines). By setting the horizontal and vertical gate pulses 46 and 48, a selected range 66 (shown by the solid square outline) of the image signal 40 is selected. An area corresponding to the reflected light of the image signal 40 is reduced by selecting the range of the reflected light. The polarizing filter is then rotated to decrease the reflected light elements from the selected range 46 of the image signal 40.

It is, therefore, preferable for level detection circuit 11 illustrated in FIG. 1 to be able to select either the entire range of the image signal, or a portion of the range of the image signal. A signal that corresponds to a level of the image signal within the selected range is then output. For example, a switch is used to select either the entire image signal or a desired range of the image signal. Level detection circuit 11 outputs a signal that corresponds to the level of the image signal within the selected range through a gate pulse having a pulse width and position that corresponds to the selected range. In order to reduce the range that corresponds to reflected light in the image signal, polarizing filter 5 is rotated so that the output signal from level detection circuit 11 is decreased.

As illustrated in FIG. 1, the output signal from level detection circuit 11 is received by DC conversion circuit 12. DC conversion circuit 12 then converts the output from level detection circuit 11 into a DC voltage using an integration process. The signal output from DC conversion circuit 12 may be a DC voltage signal in which a pedestal level, black level, or a specified level is set at 0V. By converting the output signal from level detection circuit 11 into a DC voltage signal, subsequent signal processing and control of DC motor 15 is simplified. Moreover, in order to reduce an area that corresponds to reflected light in the image signal, polarizing filter 5 should be rotated to decrease the output signal of DC conversion circuit 12.

Figure 5:
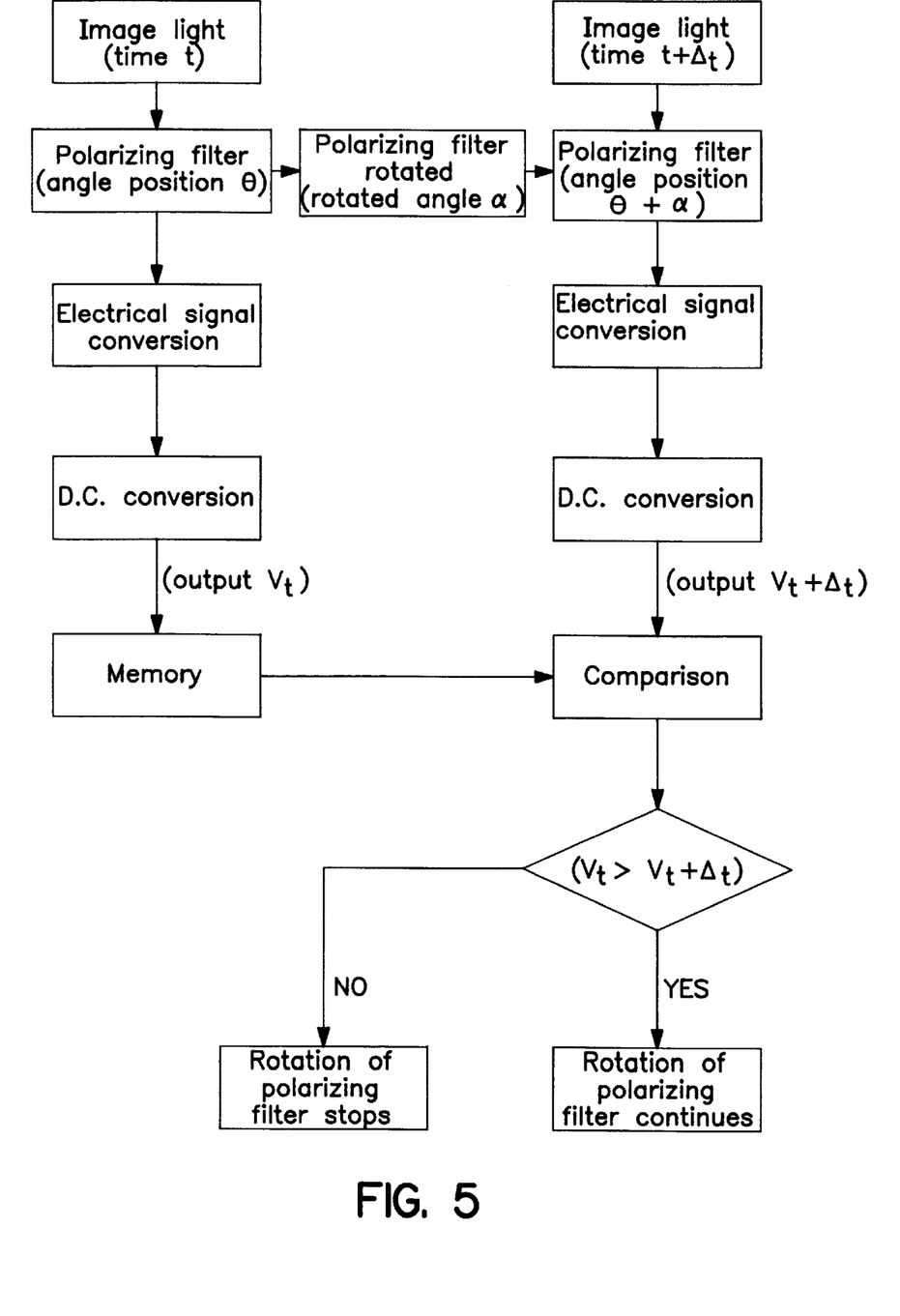
FIG. 5 is a flowchart illustrating a process of rotation of a polarizing filter to decrease an output signal of a DC conversion circuit.

There are various ways to rotate polarizing filter 5 to decrease the output signal of DC conversion circuit 12. FIG. 5 illustrates a preferred embodiment for a process of rotating polarizing filter 5. When polarizing filter 5 is at a rotational angle position ($\theta$) at time (t), image light is received by polarizing filter 5 and lens 2, and is converted into an electrical signal at imaging element 2. The electrical signal is received by level detection circuit 11 and is input by DC conversion circuit 12. DC conversion circuit 12 converts the output signal from level detection circuit 11 into a DC voltage $V_t$. This output DC voltage signal $V_t$ is received by minimum value detection circuit 13 and stored in memory 21. DC motor 15 is then rotated by drive control circuit 14. Rotation of DC motor 15 is mechanically transmitted in order to rotate polarizing filter 5 for a specified angle ($\alpha$) at every specified interval of time ($\Delta_t$) to attain a rotational angle position ($\theta+\alpha$) for polarizing filter 5 at time (t+$\Delta_t$). Output signal $V_t+\Delta_t$ from DC conversion circuit 12 is compared with voltage signal $V_t$ stored in memory 21 by CPU 20. If output signal $V_t+\Delta_t$ is less than voltage signal $V_t(V_t>V_t+\Delta_t)$, polarizing filter 5 continues to be rotated by drive control circuit 14. On the other hand, it is also acceptable to reverse direction of rotation of polarizing filter 5 by drive control circuit 14 when voltage signal $V_t$ is less than output signal $V_t+\Delta_t(V_t \leq V_t+\Delta_t)$.

By repeatedly performing rotation control of polarizing filter 5 through a consecutive comparison process, polarizing filter 5 can be rotated so that the output signal of DC conversion circuit 12 automatically decreases. As a result, the area that corresponds to reflected light of the image signal can be automatically and accurately reduced.

If the effect of reflected light changes over time when using a video camera, it is preferable to have polarizing filter 5 continuously rotate an increment of a specified angle at a specified time interval during photographic operation. As a result, it is possible to rotate polarizing filter 5 in a direction that reduces the reflected light by accurately responding to a chronological change of the effect of reflected light without delay.

Furthermore, a value for a specified rotational angle ($\alpha$) and a specified rotational interval ($\Delta_t$) may be set in order to prevent an adverse effect on the photography. Rotational angle $\alpha$ and rotation interval $\Delta_t$ can also eliminate reflected light depending on photographic conditions. Rotational angle $\alpha$ and rotational interval $\Delta_t$ may also be set randomly. For example, turbulence of image prevails if rotational angle ($\alpha$) is excessively large. Response of polarizing filter 5 is delayed when the amount of reflected light that changes with time is excessively small. CPU 20 may be a comparator and memory 21 may be a register.

In a second preferred embodiment of the present invention, polarizing filter 5 rotates at least 90 degrees. The output signal of DC conversion circuit 12 is stored into memory 21 at each specified rotational angle with respect to a rotational angle position of polarizing filter 5. Next, CPU 20 compares output signal values of DC conversion circuit 12 stored in memory 21 to detect a rotational angle position of polarizing filter 5 at which the output signal value is a minimum. CPU 20 performs a default positioning control for polarizing filter 5 in which polarizing filter 5 is rotated to the rotational angle position by drive control circuit 14.

Such default positioning control of polarizing filter 5 may be performed when turning on a switch for an activation of photographic operations. Default positioning control may also be performed by intentionally pressing a button to start photographic operation. In addition, default position control may also be used during a photographic operation to accurately and quickly minimize an area that corresponds to image signal reflected light. This is effective for video photography when the effect of reflected light does not change with time, or for photographic operation of a still image that does not require constant following of the subject.

In a third preferred embodiment of the present invention, polarizing filter 5 is rotated to a rotational angle position at which the output signal of DC conversion circuit 12 is lowest by performing default positioning control for the polarizing filter 5 as noted above. Rotational control of polarizing filter 5 is repeatedly performed through the consecutive comparison process as described above.

Such control accurately and quickly rotates polarizing filter 5 using default position control of polarizing filter 5 at the beginning of a photographic operation. Reflected light is automatically and accurately eliminated as polarizing filter 5 is rotated. The area of reflected light in an image signal is decreased by rotationally controlling polarizing filter 5 through a consecutive comparison process, without delay, even if the effect of reflected light changes during subsequent photographic operations.

The lowest output signal value detected during default positioning control of polarizing filter 5 is used as a reference signal. This reference signal is given a reference value of 0V for the rotational control of polarizing filter 5 through a consecutive comparison process that follows. By doing so, as the amount of reflected light increases, the percentage of area corresponding to reflected light in the output signal of DC conversion circuit 12 increases. This increase is greater than other levels, such as a pedestal level, black level, or a specified level, set at reference value of 0V. As a result, accuracy in detecting changes in the reflected light is improved.

In the first preferred embodiment of the present invention, a polarizing filter control mechanism has a level detection unit for outputting a signal that corresponds to the level of the image signal of the subject obtained by a camera. A drive control unit rotates a polarizing filter so that the output signal from the level detection unit is at a minimum value. As a result, an area that corresponds to the reflected light of the image signal can be automatically eliminated. In addition, operation of the camera becomes less tedious and is easier and more precise.

Moreover, in the first preferred embodiment, it is possible to configure the polarizing filter control mechanism in such a manner that the level detection unit outputs a signal that corresponds to the level of the image signal from which the synchronous signal has been eliminated. This facilitates processing of signals and eliminates the area that corresponds to the reflected light of the image signal.

Moreover, in the first preferred embodiment, it is also possible to configure the polarizing filter control mechanism so that either the entire range, or a desired portion of the range of the image signal, can be selected. The level detection unit outputs the signal that corresponds to the level of the image signal within the selected range. A switch can be used to select whether the entire range of the image or the desired portion of the range is to be detected. This enables the operator to randomly remove the image signal from a specified range in which reflected light exists in the image.

In the second preferred embodiment of the present invention, a polarizing filter control mechanism is provided in a camera that has a polarizing filter. The polarizing filter control mechanism is equipped with an imaging element for converting the image of the subject into an electrical signal. A level detection unit outputs a signal that corresponds to the level of the image signal obtained by the imaging element. An error detection unit outputs an error signal that corresponds to the difference between the output signal of the level detection unit and a reference signal. A drive control unit rotates the polarizing filter so that the difference between the output signal of the level detection unit and the reference signal becomes a minimum value of the error signal. As a result, an area corresponding to the reflected light of the image signal can be automatically eliminated. In addition, operation of the camera becomes easier, less tedious and more precise.

Moreover, in the second preferred embodiment, it is possible to configure the polarizing filter control mechanism to provide a rotation sampling unit to rotate the polarizing filter at least 90 degrees. The output signal of the level detection unit is sampled at specified rotation angles. A memory unit stores the output signal of the level detection unit at each rotation angle sampled. A comparison detection unit compares the output signals of the level detection unit stored in the memory unit and detects a minimum value. This minimum value is designated as a reference signal. Use of the reference signal increases accuracy in detecting changes in the elements of the reflected light.

The third preferred embodiment of the present invention uses an imaging element to convert an image of a subject into an electrical signal. A level detection unit outputs a signal corresponding to the image signal. A memory unit stores the output signal of the level detection unit. An intermittent rotation unit consecutively rotates the polarizing filter to specified angles and a consecutive comparison unit compares the output signal of the level detection unit transmitted at each angle. A drive control unit rotates the polarizing filter so that the output signal of the level detection unit decreases based on the output signal of the consecutive comparison unit. As a result, an area that corresponds to the reflected light of the image signal can be automatically eliminated. In addition, operation of the camera becomes less tedious, easier and more precise. An area that corresponds to reflected light can be eliminated even if the effects of the reflected light in the photographic image change over time, making it easier to follow a moving subject.

Moreover, in the third preferred embodiment, a default positioning control unit can be used to rotate the polarizing filter to a rotation angle where the output signal of the level detection unit is at a minimum value.

Furthermore, in the second and third preferred embodiments, the level detection unit may also integrate the electrical signal output from the imaging element and convert it into a DC voltage output. As a result, it is easier to control the DC motor used for processing the signal or rotating the polarizing filter.

The present invention is not limited to the embodiments disclosed. Any embodiment configured in such a manner that a polarizing filter is rotated to decrease the level of the image signal in a camera with a polarizing filter would be preferable. Minimum value detection circuit 13 and drive control circuit 14 may have other configurations as long as polarizing filter 5 is rotated to minimize the output signal of level detection circuit 11 or DC conversion circuit 12. Furthermore, in addition to a video camera, a still camera with the capability to convert image light into an electrical signal may also be used.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A polarizing filter control mechanism comprising:
    a polarizing filter;
    a level detection unit to output a level detection signal corresponding to an image signal of a subject;
    a drive control unit to rotate said polarizing filter to minimize the level detection signal;
    an imaging element to convert the image signal of the subject to a corresponding electrical signal, wherein the electrical signal is input to the level detection unit; and
    a minimum value detection unit to compare the level detection signal with a reference signal and output a corresponding error signal.

2. The polarizing filter control mechanism according to claim 1, wherein the reference signal is a minimum value detected by said minimum value detection unit.

3. The polarizing filter control mechanism comprising:
    a polarizing filter;
    a level detection unit to output a level detection signal corresponding to an image signal of a subject; and
    a drive control unit to rotate said polarizing filter to minimize the level detection signal wherein the level detection signal corresponds to a level of the image signal from which a synchronizing signal has been removed.

4. A polarizing filter control mechanism comprising:
    a polarizing filter;
    a level detection unit to output a level detection signal corresponding to an image signal of a subject;
    a drive control unit to rotate said polarizing filter to minimize the level detection signal;
    a minimum value detection unit to compare the level detection signal with a reference signal and output a corresponding error signal;
    a rotation sampling unit to rotate the polarizing filter and sample the level detection signal at designated angles; and
    a memory unit to store the sampled level detection signal, wherein the minimum value detection unit compares the level detection signal in the memory unit and detects a minimum value of the level detection signal.

5. The polarizing filter control mechanism according to claim 4, wherein rotation of the polarizing filter is greater than 90 degrees.

6. A polarizing filter control mechanism in a camera, comprising:
    a polarizing filter;
    a level detection unit to output a level detection signal corresponding to an image signal of a subject;
    a drive control unit to rotate said polarizing filter;
    an imaging element to convert the image signal of the subject to a corresponding electrical signal, wherein the electric signal is input to said level detection unit; and
    a minimum value detection unit to compare the level detection signal with a reference signal and output a corresponding error signal, wherein said drive control unit minimizes the level detection signal through rotation of said polarizing filter in response to the error signal.

7. The polarizing filter control mechanism according to claim 6, further comprising:
    a default position control unit to rotate the polarized filter to a rotation angle where the level detection signal is a minimum value.

8. The polarizing filter control mechanism according to claim 6, wherein the level detection unit integrates and converts the electrical signal to a DC voltage output.

9. The polarizing filter control mechanism according to claim 6, further comprising a range selection unit to select a range of the image signal wherein the level detection signal corresponds to the image signal within the selected range.

10. The polarizing filter control mechanism according to claim 6, wherein the level detection signal corresponds to a level of the image signal from which a synchronizing signal has been eliminated.

* * * * *